United States Patent [19]

Azibert et al.

[11] Patent Number: 5,209,496
[45] Date of Patent: May 11, 1993

[54] UNIVERSAL SEAL OR PACKING GLAND

[75] Inventors: Henri V. Azibert, Windham; Margaret B. Willbrant, Derry, both of N.H.; Marlen S. Clark, Newburyport; Ann T. Attenasio, Revere, both of Mass.

[73] Assignee: AWChesterton Company, Stoneham, Mass.

[21] Appl. No.: 918,887

[22] Filed: Jul. 24, 1992

Related U.S. Application Data

[63] Continuation of Ser. No. 619,751, Jan. 28, 1990, abandoned.

[51] Int. Cl.⁵ .............................................. F16J 15/34
[52] U.S. Cl. ............................................. 277/9; 277/11; 403/288; 403/337
[58] Field of Search ............. 277/4, 9, 9.5, 10, 11, 277/101, 105, 187; 403/4, 488, 337; 411/965, 966, 968, 970, 999, 107

[56] References Cited

U.S. PATENT DOCUMENTS

| | | |
|---|---|---|
| 363,956 | 5/1887 | Havanagh . |
| 1,061,632 | 5/1913 | Podolsky . |
| 3,601,412 | 8/1971 | Malmstrom ................. 277/11 X |
| 3,675,933 | 7/1972 | Nappe ......................... 277/1 X |
| 4,095,809 | 6/1978 | Smith ........................ 277/11 X |
| 4,269,417 | 5/1981 | Dutton ......................... 277/11 |
| 4,332,391 | 6/1982 | Arnold ......................... 277/11 |
| 4,538,820 | 9/1985 | Duffee ......................... 277/11 |
| 4,561,796 | 12/1985 | Hauaoka ................. 403/377 X |
| 4,623,152 | 11/1986 | St. Jean . |
| 4,625,977 | 12/1986 | Azibert et al. ............. 277/9 X |
| 4,768,907 | 9/1988 | Gauron ..................... 411/966 X |
| 4,858,936 | 8/1989 | Adams ......................... 277/1 |
| 5,071,139 | 12/1991 | Warner ....................... 277/9 X |

Primary Examiner—William A. Cuchlinski, Jr.
Assistant Examiner—Scott W. Cummings
Attorney, Agent, or Firm—Lahive & Cockfield

[57] ABSTRACT

A universal gland defining a central opening for mounting the gland coaxially about a machine shaft to the machine housing, the mounting done with a plurality of bolts at bolt hole positions in the housing. A gland body includes a mounting surface for placement adjacent the housing, and facing away from the mounting surface at least one tab-engaging surface is engaged by tabs for transferring forces from the bolts to the machine via the gland body. Bolt-mounting tabs are configured to extend radially beyond the periphery of the gland body a distance at least to the bolt hole positions of the machine. The tabs are angularly adjustable about the gland body.

34 Claims, 6 Drawing Sheets

UNIVERSAL SEAL OR PACKING GLAND

This application is a continuation of application Ser. No. 07/619,751, filed Nov. 28, 1990, now abandoned.

BACKGROUND OF THE INVENTION

This invention relates to seal glands used with mechanical seals or packings and more particularly to a universal seal or packing gland adapted for use with a variety of mounting bolt patterns.

Seal glands are positioned about machine shafts and are bolted to the housing where the shaft exits the machine, e.g., a pump, to enclose packing or mechanical seals in a stuffing box. As various bolt patterns are employed by different manufacturers for the bolts securing the seal gland to the housing, seal glands that accommodate various bolt patterns are desirable. One such gland is disclosed in U.S. Pat. No. 4,269,417, in which the mounting portion of the gland extends radially outwardly past the outermost anticipated bolt position. The mounting portion has a first pair of bolt positions that includes radially elongated slots positioned at opposite sides of the gland. Equidistantly spaced between the slots is a second pair of bolt positions, each including a plurality of detents radially spaced from each other at predetermined radial positions. Bolt holes may be accurately drilled as required at a selected detent at each position. Although the bolt positions can, within limits, be adjusted radially, the angular positions of the bolts are predetermined by the slots and the detents.

SUMMARY OF THE INVENTION

In one aspect, the present invention features a universal gland having a central opening for mounting coaxially about a machine shaft and adapted for mounting to a machine housing, through which the shaft extends, by a plurality of bolts at bolt hole positions in the housing, characterized in that the gland comprises a gland body extending radially at the bolt positions a distance less than the minimum radial distance of the bolt positions from the axis of the shaft; the gland further comprises a plurality of bolt mounting tabs extending radially beyond the periphery of the gland body a distance at least to the bolt positions; the tabs are angularly adjustable about the gland body; and the gland body comprises a mounting surface for placement adjacent the housing and facing away from the mounting surface at least one tab engaging surface engaged by the tabs for transferring forces from the bolts to the gland body.

In a most preferred embodiment, the gland comprises a continuous annular channel extending about the outer periphery of the gland, the channel extending inwardly from the periphery to a channel base having a wider axial dimension than the dimension of the channel at the periphery, the channel having a slot extending through a wall of the gland to the channel to permit insertion into and removal from the channel of portions of the tabs, the wall of the channel facing away from the mounting surface comprising the tab engaging surface. Alternatively, the gland comprises a plurality of arcuate recesses positioned in the outer wall of the gland opposite the mounting surface and adapted to detachably receive portions of the bolt bearing tabs extending therein.

In another preferred embodiment the gland comprises a plurality of slots about the outer periphery of the gland, each slot extending inwardly from the gland periphery to a base having a wider circumferential dimension than the circumferential dimension of the slot at the periphery, the slots being adapted to detachably receive the portions of the tabs extending therein, the slots extending axially from and open at the outer wall of the gland and closed at the other end thereof, opposite the mounting surface, the closed end comprising the tab engaging surface.

In another aspect, the invention features a bolt bearing tab for detachable mounting in a recess in a seal gland characterized in that the bolt bearing tab comprises a body having a bolt bearing surface on one side thereof, a base at one end of the side and a projection extending from and adjacent the base for engagement in a recess in the gland, the tab having a gland engaging surface facing generally opposite the bolt bearing surface.

Preferably, the gland body engaging surface of the tab is a surface of the projection and the projection extends below the tab base to a projection base and has a greater dimension at the projection base than at the tab base, the greater dimension of the tab base extending away from the bolt bearing surface.

The universal gland and attached bolt bearing tabs can accommodate a variety of bolt patterns and bolt sizes and, thus, reduce the need for stocking a wide variety of special purpose glands. The detachable bolt bearing tabs permit the substitution of tabs of different lengths, to accommodate a variety of radial bolt positions. The circumferentially adjustable tabs likewise accommodate different angular bolt positions. Advantageously, the minimal gland diameter reduces material used by the gland. Also, the reduced diameter of the gland and the adjustable tabs can more easily accommodate the interfering structure, e.g., piping, adjacent the bolt positions.

Other features and advantages of the invention will be apparent from the following description of the preferred embodiment thereof and from the claims.

DETAILED DESCRIPTION

A universal gland according to the invention has detachable, interchangeable tabs of different lengths that preferably can be positioned at different angular positions about the circumference of the gland to accommodate different bolt positions. The gland has an outer diameter smaller than the minimum diameter of the bolt patterns with which it is intended to be used. In use, bolts attach the gland to the housing of the machinery, at the exit point of the machine shaft, between two adjacent tabs at the appropriate angular position, with a washer overlying the tabs. The bolts are tightened down to secure the gland to the machine housing.

Figure 1:
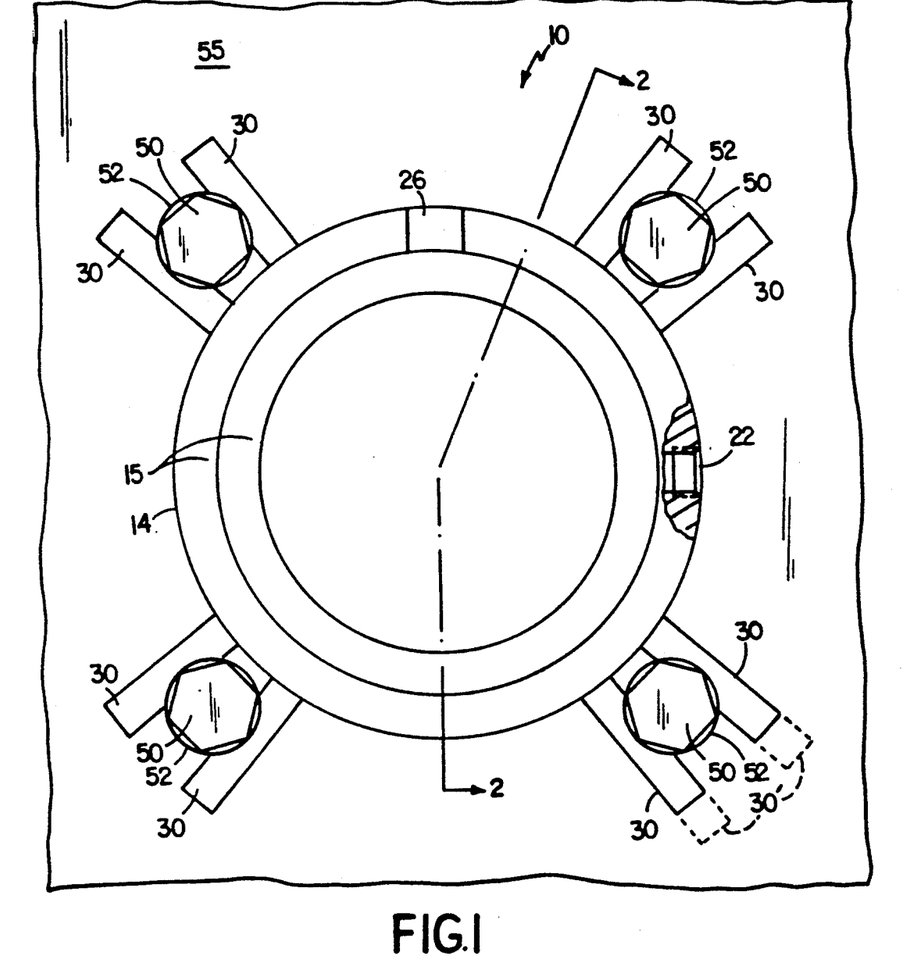
FIG. 1 is a front elevation view of a seal gland according to the invention.
Figure 2A:
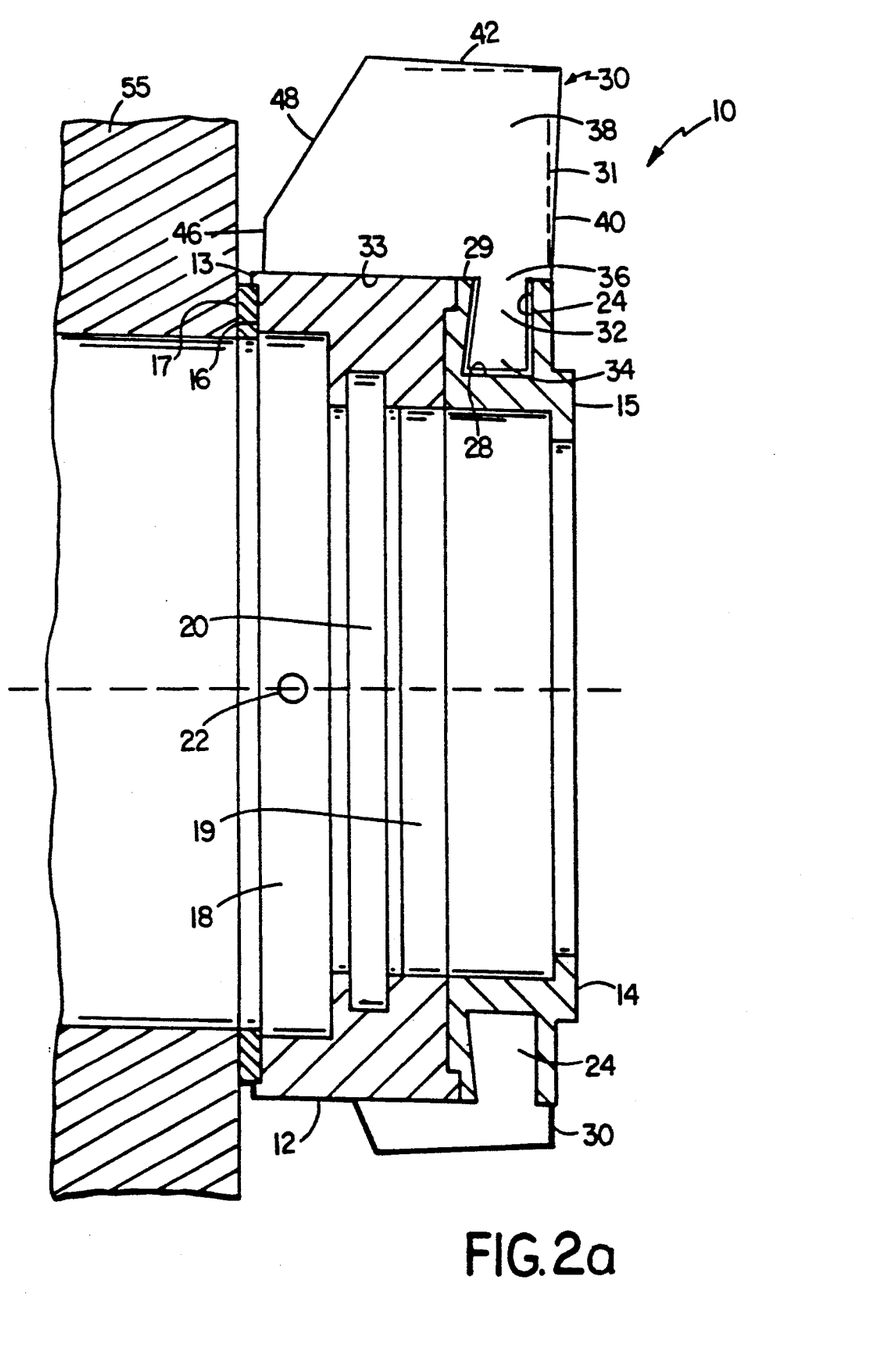
FIG. 2a is a sectional view of the seal gland, taken at line 2—2 of FIG. 1 prior to the insertion of mounting bolts.

Referring to FIGS. 1 and 2a, the illustrated universal gland 10 comprises a two part gland body, consisting of gland front 12 and outer gland end 14, having a central opening for mounting coaxially about a machine shaft. Gland front 12 comprises a mounting surface having an annular recess 16, in which a gasket 17 may be positioned, at its face adjacent a machine housing 55 and opposite gland end 14. The gland front 12 also comprises, groove 20. Gland end 14 comprises a radially outwardly facing continuous arcuate annular tab recess or channel 24 at its periphery 29 supporting a plurality of slidably movable, radially extending bolt bearing tabs 30 and has a slot defining a channel entrance 26 in its outer front wall 15, illustrated in FIG. 1, extending radially to the periphery 29 of the gland body for inserting bolt tabs 30 into channel 24. Tab channel 24 has a progressively wider axially extending dimension toward its base 28 within gland end 14 than at the outer surface 29 thereof. The interior portion of gland end 14, in the illustrated embodiment, also comprises, together with the interior of gland front 12, a channel 19. Fluid inlet and outlet ports may be provided through the gland to one or both of channels 18, 19, one port 22 being shown in cutaway in FIG. 1. The outer diameter of gland 10 is less than the minimum radial distance of the bolt positions from the machine shaft with which the gland is to be utilized.

Mounting bolt tabs 30 are positioned around the periphery of gland end 14 to accommodate the specific bolt pattern on the machine housing to which the gland is to be applied. Each bolt tab 30 comprises a body 31 comprising a relatively narrow front bolt bearing surface 40 and sides 38 having a width substantially the axial thickness of the gland 10. Bolt tabs 30 extend radially beyond the periphery of the gland body a distance at least equal to the minimum radial distance of bolt hole positions from the shaft and housing axes in the housing to which the gland is to be secured. Adjacent and below the front surface 40, each bolt tab 30 includes a channel projection 32 extending from tab base 33, having a configuration matching the axial configuration of channel 24, with a wider projection base 34 extending axially away from surface 40, which rides in the innermost portion of channel 24, and a narrower region 36, which rides in the outermost portion of channel 24. Clearance is provided between channel projection 32 in channel 24, e.g., about 0.008", to permit movement of the tab 30 about the gland end 14, with projection 32 in channel 24. Thus, each channel projection 32 of a tab 30 is held in channel 24 and can be inserted into or removed from channel 24 only through channel entrance 26, which is slightly wider than projection 32.

As illustrated in FIG. 2a, as a tab 30 is originally positioned with projection 32 in channel 24, and before bolts 50 are located between adjacent tabs, the front bearing surface 40 of tab 30 is angularly disposed to its base 33 and to the front surface 15 of gland end 14, bearing surface 40 extending outwardly from surface 15 at an angle of 3° from the vertical, indicated by the broken vertical line in FIG. 2a. The outer surface 42 of tab 30, opposite projection 32, likewise is angularly disposed to the base 33 of the tab and the outer surfaces of gland end 14 and gland front 12, sloping upwardly from bearing surface 40 at an angle of about 3° to the horizontal, as indicated by the broken horizontal line in FIG. 2a. Rear surface 46 of tab 30, opposite front surface 40, is truncated short of the rear surface 13 of gland front 12, so as to provide clearance for gasket 17, and is chamfered along its outer extent 48, so as to eliminate unnecessary material and to provide clearance for piping or other obstructions on the machine to which gland 10 is attached.

Figure 2B:
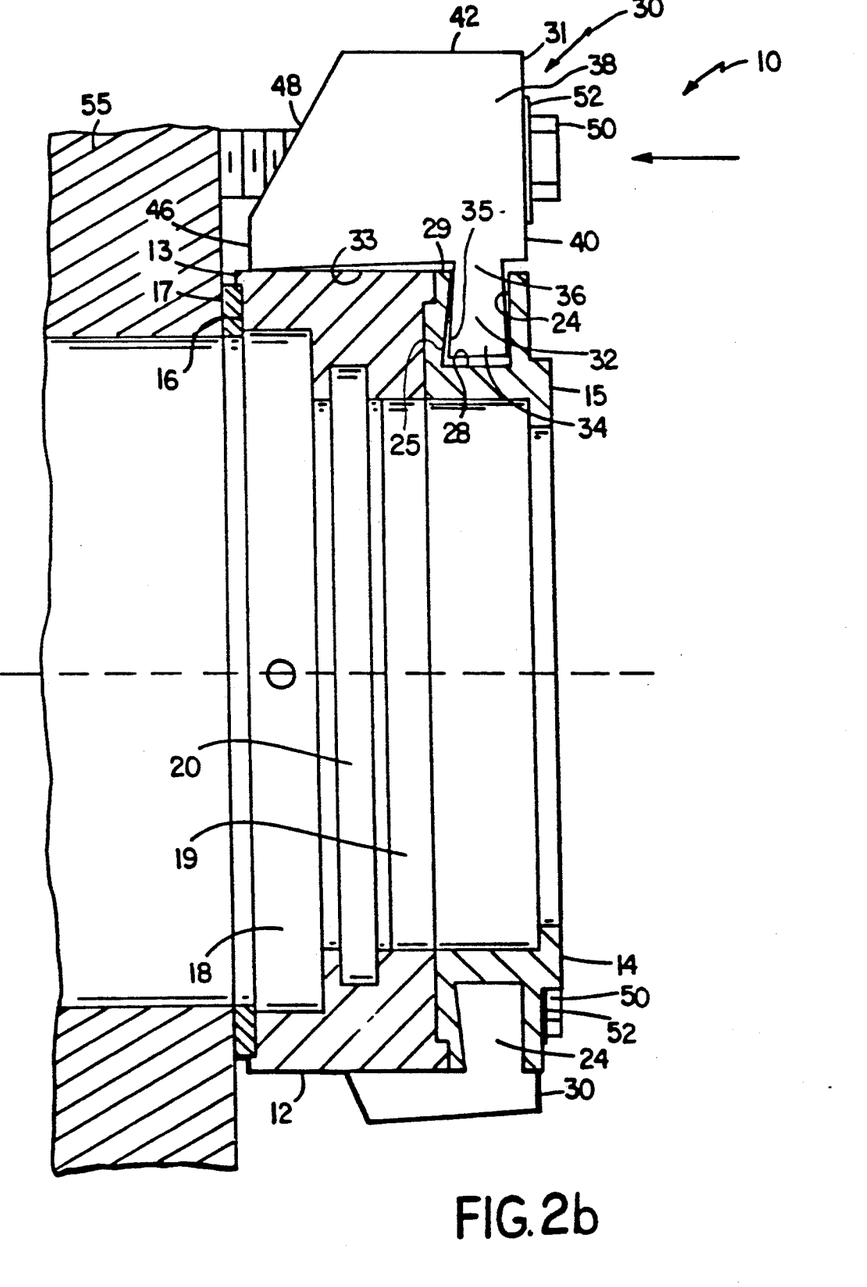
FIG. 2b is a sectional view of the seal gland, taken at line 2—2 of FIG. 1 after the insertion of mounting bolts.

In use, tabs of appropriate length are mounted to the gland body by inserting tab projection 32, through slot 26, into channel 24. Two tabs are inserted for each bolt. The angular position of the tabs is adjusted for the particular bolt hole pattern by sliding the tabs and tab projections 32 about channel 24. A washer 52 is placed on a bolt 50 and the bolt is tightened on two adjacent tabs. Referring to FIG. 2b, when gland 10 is located in position around the machine shaft (not shown) and bolts 50, overlying washers 52, are located between adjacent tabs at the appropriate positions, each tightened down on two adjacent tabs 30 to fasten gland 10 to the housing, bolts 50 apply a force to the front surface 40 of each tab 30 in the direction of the arrow. The channel projection 32 of each tab 30 then becomes skewed in channel 24, because of the clearance in the channel, and the body 31 of tab 30 tilts axially rearwardly about 3°, thus resulting in a final vertical alignment of the bolt bearing surface 40 against which bolt 50 and washer 52 bear. Surface 42 of the tab likewise assumes a parallel position to the outer surface of the gland end 14 and the gland front 12. The outwardly facing wall 25 of channel 24 and the inwardly facing wall 35 of projection 32 are mutually engaging surfaces which transfer forces from the bolts to the gland body securing the gland to the housing.

Figure 3:
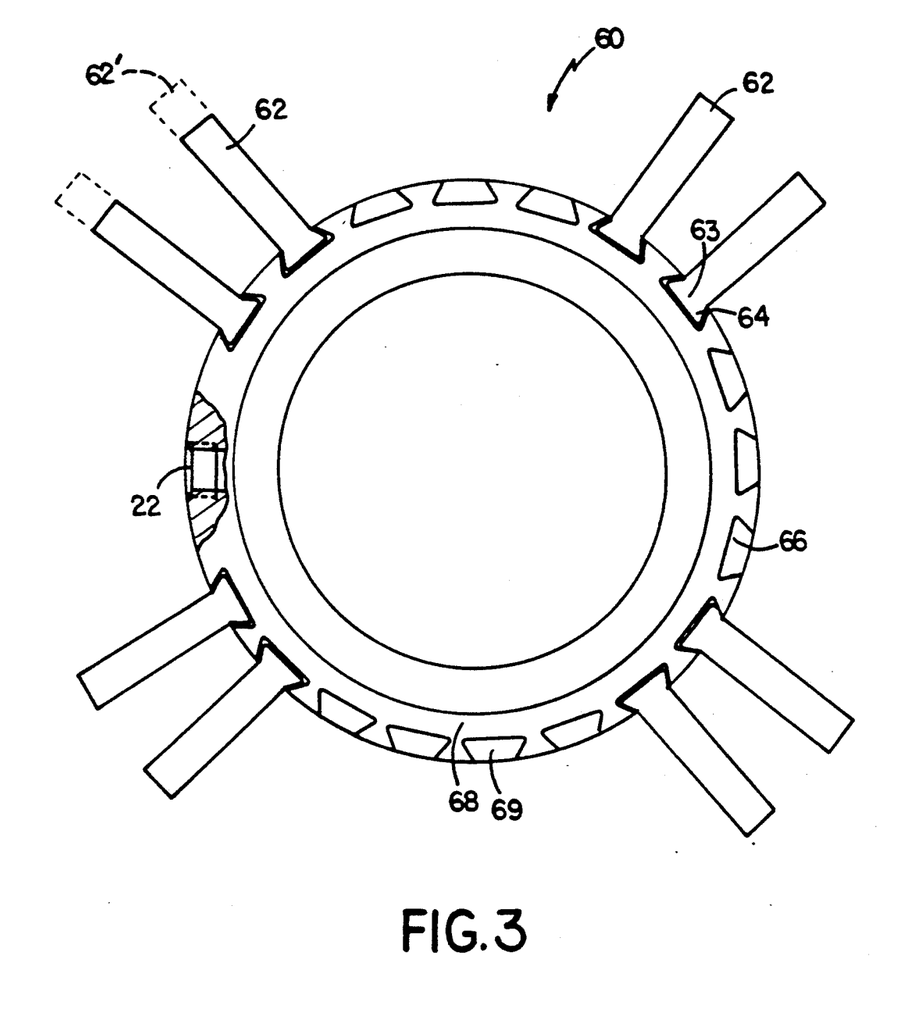
FIG. 3 is a front elevation view of an alternate embodiment of a seal gland.

Other embodiments of this invention which will occur to those skilled in the art are within the scope of the following claims. For example, referring to FIG. 3, in an alternate embodiment of a seal gland 60, bolt tabs 62, comparable to tabs 30 in the embodiment 10 of FIG. 1, are attached to gland 60 by dovetail joints 64, comprising axially extending tab projections 63 in axially extending dovetail slots 66 located around the periphery of the gland, instead of riding in an annular channel such as channel 24, shown in FIG. 2a. The slots 66 and tab projections 63 are greater in circumferential dimensions at their bases than at the periphery of the gland. The slots are open at the radially outer end face 68 of the gland 68 and closed at the inner end 69, the tab projections 63 and closed ends of the slots at the inner end 69 of the gland providing mutually engaging surfaces in dovetail joints 64, thus transferring forces from the bolts to the gland. In this embodiment the dovetail slots 66 are angularly spaced at regular increments to permit angular adjustment of the tabs 62.

Figure 4:
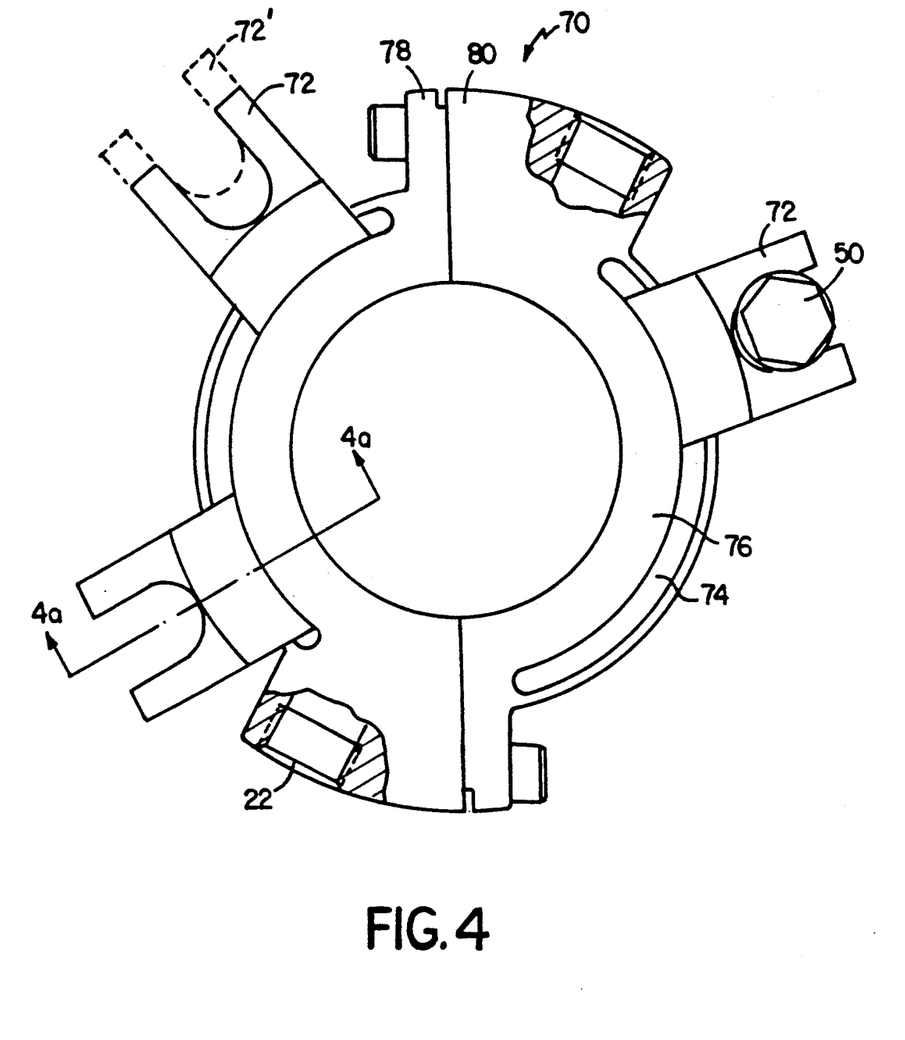
FIG. 4 is a front elevation view of another alternate embodiment of a seal gland.
Figure 4A:
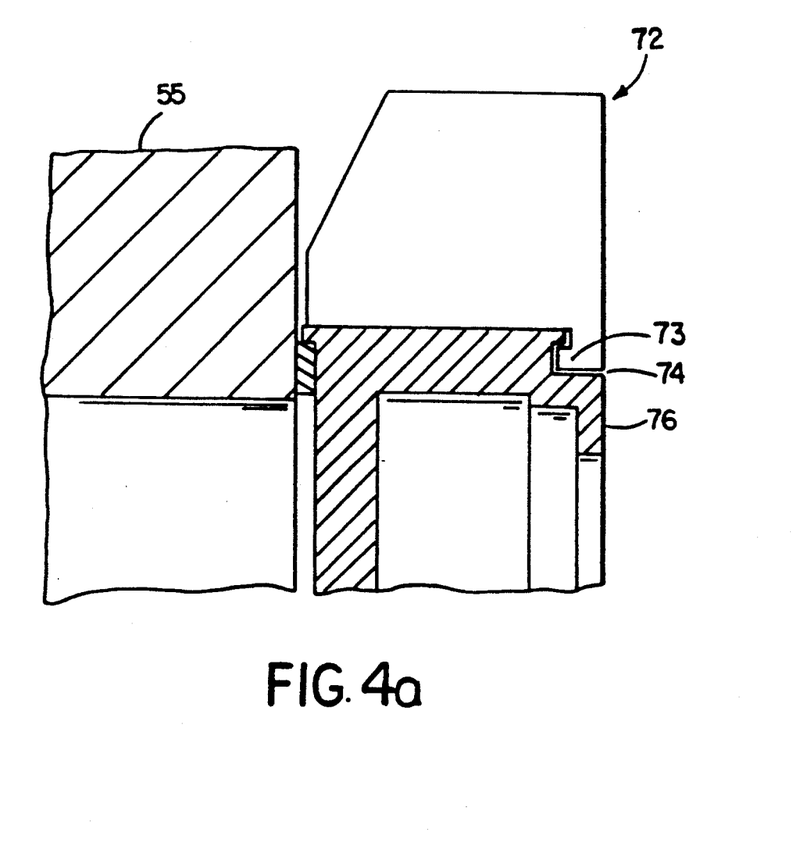
FIG. 4a is a sectional view of the embodiment of FIG. 4.

Referring to FIGS. 4 and 4a, in another alternate embodiment of a seal gland 70, U-shaped bolt tabs 72, each capable of supporting a bolt 50, are attached to gland 70 and are angularly adjustable by means of projections 73 extending into a pair of arcuate channels 74 in the outer front surface 76 of the gland. Gland 70 is split into two portions 78, 80 for ease of installation around a machine shaft.

In any of the illustrated embodiments bolt tabs of various lengths 30', 62', 72' may be substituted for the illustrated tabs to accommodate bolts at different diameters. Further, although the invention is described with reference to bolts, it is to be understood that the bolts may comprise studs projecting from a machine housing, as is common, in which case nuts are secured on the ends of the studs bearing on washers contacting the tabs. Although the interior of the gland 10 illustrated in FIGS. 2a, 2b and 4a has been described, it is to be understood that the interior design is not part of the invention and can be modified to suit particular seal or packing arrangements.

What is claimed is:

1. A universal gland body defining a central opening, said gland body for mounting, coaxially about a machine shaft, to a machine housing through which said shaft extends, the mounting done with a plurality of bolts at fixed bolt positions in said housing, said gland body characterized in that said gland body is adapted to be mounted to said machine housing via mounting tabs and comprises a mounting surface for placement adjacent said housing, at least one tab-engaging means having a tab-engaging surface facing away from said mounting surface, means for application of pressure from a location extending radially beyond the periphery of said gland body to secure said gland body to said housing via a plurality of said mounting tabs engaged with said tab-engaging surface, said application mans configured to engage said tabs at circumferentially adjustable positions relative to said gland body with said tabs extending radially beyond the periphery of said gland body for application of pressure from said bolts to secure said gland body to said housing via said tabs.

2. The universal gland body claimed in claim 1 further characterized in that said gland body is adapted to detachably receive said tabs.

3. The universal gland body claimed in claim 2 further characterized in that said gland body comprises at least one arcuate recess on a portion of a surface of said gland body other than said mounting surface, adapted to receive portions of said tabs extending therein.

4. The universal gland body claimed in claim 3 further characterized in that said recess comprises a continuous annular channel extending about the outer periphery of said gland body, said channel extending inwardly from said periphery, and a wall of said channel facing away from said mounting surface comprises said tab-engaging surface.

5. The universal gland body claimed in claim 4 further characterized in that said channel extends inwardly to a channel base having a wider axial dimension than the dimension of said channel at said periphery, and a slot extends through a wall of said gland body to said channel to permit insertion into and removal from the channel of portions of said tabs configured with a base having an axial dimension greater than that of said channel at said periphery.

6. The universal gland body claimed in claim 3 further characterized in that said gland body comprises a plurality of arcuate recesses in a surface of said gland body other than said mounting surface, each of said arcuate recesses adapted to receive a portion of one said bolt-bearing tab extending therein.

7. The universal gland body claimed in claim 6 further characterized in that said recesses define axially extending dovetail slots opening out radially and located on the periphery of said gland body.

8. The universal gland body claimed in claim 7 further characterized in that said slots are adapted to receive said portions of said tabs extending therein, said slots extending axially from an opening at an axial face of said gland body and closed at the other end thereof, opposite said mounting surface, said closed end comprising said tab-engaging surface.

9. The universal gland body claimed in claim 8 further characterized in that each said slot extends inwardly from said gland periphery to a base having a wider circumferential dimension than the circumferential dimension of said slot at said periphery.

10. The universal gland body claimed in claim 6 further characterized in that said recesses are positioned on an axial face of said gland body opposite said mounting surface.

11. The universal gland body claimed in claim 10 further characterized in that said recesses comprise a pair of arcuate channels on said axial face, with said channels located radially inwardly of the periphery of said gland body.

12. The universal gland body claimed in claim 11 further characterized in that a radially outer surface of one of said channels is defined by a first axial surface of said axial face at a first axial location relative to said mounting surface, and a radially inner surface of said one channel is defined by a second axial surface of said axial face at a second axial location, wherein said first axial surface is axially offset from said second axial surface toward said mounting surface.

13. The universal gland body claimed in claim 12 further characterized in that said first axial surface defines one said tab-engaging surface for receipt of a projection of one said tab.

14. The universal gland body claimed in claim 2 further characterized in that said gland body is split into two portions.

15. The universal gland body claimed in claim 14 further characterized in that said portions mate axially.

16. The universal gland body claimed in claim 14 further characterized in that said portions mate radially.

17. A universal gland having a central opening thereof for mounting said gland coaxially about a machine shaft, said gland for mounting to a machine housing through which said shaft extends, said mounting done by a plurality of bolts at fixed bolt positions on said housing, said gland comprising a plurality of bolt-mounting tabs for cooperation with said bolts, and said gland further comprising a gland body having mounting means for mounting said tabs in an orientation such that said tabs extend radially beyond the periphery of said gland body, said mounting means comprising a universal receiver for receiving said tabs at circumferentially adjustable positions relative to said gland body, said tabs having projections for detachably connecting said tabs to said gland body via said mounting means, and said mounting means comprising at least one tab-engaging surface for engagement by said tab projections for transferring mounting forces from said bolts to said machine housing via said gland body.

18. The gland claimed in claim 17 further characterized in that said mounting means comprises at least one arcuate recess extending about said gland body, said recess opened to receive at least one said tab projection extending therein.

19. The universal gland claimed in claim 18 further characterized in that said recess defines a circumferential channel in said gland body periphery.

20. The universal gland claimed in claim 19 further characterized in that said recess defines an axially extending dovetail slot located on the periphery of said gland body.

21. The universal gland claimed in claim 18 further characterized in that said recess defines an arcuate channel in an axial face of said gland body.

22. The universal gland claimed in claim 19 further characterized in that said channel comprises a continuous annular channel extending about the outer periphery of said gland body, said channel extending inwardly from said periphery, said gland body further comprising a mounting surface for placement adjacent to said housing, wherein a wall of said channel facing away from said mounting surface comprises said tab-engaging surface of said mounting means, said channel receiving said tab projections.

23. The universal gland claimed in claim 22 further characterized in that said channel extends inwardly from said periphery to a channel base having a wider axial dimension than the dimension of said channel at said periphery, said tab projections having bases fitting in said channel and which have a wider axial dimension than the dimension of said channel at said periphery, with a slot extending through a wall of said gland body to said channel to permit insertion into and removal from said channel of said tab projections.

24. The universal gland claimed in claim 20 further characterized in that said gland body further comprises a mounting surface for placement adjacent to said housing and said mounting means comprises a plurality of said slots located about the periphery of said gland body for receipt of said tab projections.

25. The universal gland claimed in claim 24 further characterized in that each said slot extends axially from and is open at the end thereof opposite said mounting surface and is closed at the other end thereof, said closed end comprising one said tab-engaging surface, and one said tab projection couples in one said slot with each said tab projection engaging each said tab-engaging surface thereof.

26. The universal gland claimed in claim 25 further characterized in that each slot extends inwardly from said gland body periphery to a base having a wider circumferential dimension than the circumferential dimension of said slot at said periphery and said portions of said tabs in said slots have bases having a circumferential dimension greater than the dimension of said slots at said periphery.

27. The universal gland claimed in claim 21 further characterized in that said mounting means comprises a pair of recesses, said recesses defined as arcuate channels on an axial face of said gland body, said channels located radially inwardly of said periphery.

28. The universal gland claimed in claim 27 further characterized in that one said channel is defined between a radially inner surface of said gland body, said radially outer surface defining a first axial surface of said axial face, and said radially inner surface defining a second axial surface of said axial face.

29. The universal gland claimed in claim 28 further characterized in that said first axial surface is axially offset from said second axial surface toward said mounting surface and defines one said tab-engaging surface.

30. The universal gland claimed in claim 29 further characterized in that one said tab projection defines a U-shaped flange thereon for mounting said tab to said edge.

31. The bolt-bearing tab claimed in claim 29 further characterized in that said projection extends between said first and second face, and said projection has a greater dimension at said projection base than at said body base.

32. The bolt-bearing tab claimed in claim 29 further characterized in that a U-shaped surface is defined in said projection extending from said first face to said second face.

33. The bolt-bearing tab claimed in claim 29 further characterized in that first face defines a U-shaped bolt-bearing surface.

34. A bolt-bearing tab for mounting a gland body to a machine housing mounting surface by transferring mounting force generated at a mounting bolt connected to said housing to said housing mounting surface via said tab and said gland body, characterized in that
   said tab comprises a body and a projection extending away from said body, said body having a top surface and a bottom surface with a bolt mounting hole extending therebetween, said hole extending along a bolt mounting axis for receipt of a mounting bolt, said bottom surface defining a gland-body-engagement surface, said projection extending transversely to said axis and having a tapered surface extending axially generally along said axis between said top and bottom surfaces, said tapered surface widening axially as said projection extends away from said body.

* * * * *